United States Patent
Katayama et al.

(10) Patent No.: US 6,675,092 B1
(45) Date of Patent: *Jan. 6, 2004

(54) MAP INFORMATION SYSTEM FOR MOVING BODY

(75) Inventors: Mutsumi Katayama, Saitama (JP); Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 09/608,220

(22) Filed: Jun. 30, 2000

(30) Foreign Application Priority Data

Jun. 30, 1999 (JP) ............................................. 11-185813

(51) Int. Cl.$^7$ .......................... G01C 21/30; G09G 5/00; G08G 1/123
(52) U.S. Cl. ...................... 701/208; 345/660; 340/995.1
(58) Field of Search ................................ 701/212, 209; 345/441, 660, 667, 668, 661; 340/990, 995.1; 707/208

(56) References Cited

U.S. PATENT DOCUMENTS

| | | | |
|---|---|---|---|
| 5,473,324 A | | 12/1995 | Ueno .......................... 340/990 |
| 5,757,268 A | * | 5/1998 | Toffolo et al. ............... 340/459 |
| 5,802,492 A | * | 9/1998 | DeLorme et al. ............ 340/990 |
| 5,848,375 A | * | 12/1998 | Nunobiki et al. ............ 340/988 |
| 5,917,436 A | * | 6/1999 | Endo et al. .................. 340/988 |
| 5,948,040 A | * | 9/1999 | DeLorme et al. ............ 340/990 |
| 6,006,161 A | * | 12/1999 | Katou .......................... 340/988 |
| 6,011,494 A | * | 1/2000 | Watanabe et al. ............ 340/990 |
| 6,064,941 A | * | 5/2000 | Nimura et al. ............... 340/988 |
| 6,067,502 A | * | 5/2000 | Hayashida et al. .......... 340/990 |
| 6,107,944 A | * | 8/2000 | Behr et al. ................... 340/988 |
| 6,121,900 A | * | 9/2000 | Takishita ..................... 340/990 |
| 6,144,920 A | * | 11/2000 | Mikame ....................... 340/988 |
| 6,154,152 A | * | 11/2000 | Ito ............................... 340/988 |
| 6,311,126 B1 | * | 10/2001 | Katayama et al. ........... 701/208 |
| 6,324,471 B1 | * | 11/2001 | Katayama et al. ........... 340/988 |
| 6,356,835 B2 | * | 3/2002 | Hayashi et al. .............. 340/988 |
| 6,445,397 B1 | * | 9/2002 | Boyer .......................... 345/667 |

FOREIGN PATENT DOCUMENTS

| | | |
|---|---|---|
| DE | 198 08 111 A1 | 10/1998 |
| EP | 0 944 032 A1 | 9/1999 |
| JP | A783684 | 3/1995 |

* cited by examiner

*Primary Examiner*—Michael Razavi
*Assistant Examiner*—Ryan Yang
(74) *Attorney, Agent, or Firm*—Birch, Stewart, Kolasch & Birch, LLP (57) ABSTRACT

To provide a map information display system for a moving body that can extract and display map information as required without updating set way points or routes. A limited region map information generating device for extracting map information for only a limited region based on a route being traveled and on a scheduled route, and for generating limited region map information includes a route generating device for generating a moving body route based on the route point coordinate information and road information, an extracting device for setting map information of a strip-shaped region extending along the moving body route as the limited region map information, and a strip-shaped region adjusting device for adjusting a size of the strip-shaped region so as to include the moving body route when it is determined that the information amount of the limited region map information is larger than a specified storage capacity but less than a storage capacity of the storage device.

3 Claims, 11 Drawing Sheets

| route | section distance | extraction width | required storage capacity |
|---|---|---|---|
| $r_1$ | $L_1$ | $\Delta w_1$ | $L_1 \times \Delta w_1$ |
| $r_2$ | $L_2$ | $\Delta w_2$ | $L_2 \times \Delta w_2$ |
| ⋮ | ⋮ | ⋮ | ⋮ |
| $r_i$ | $L_i$ | $\Delta w_i$ | $L_i \times \Delta w_i$ |
| ⋮ | ⋮ | ⋮ | ⋮ |
| $r_{n-1}$ | $L_{n-1}$ | $\Delta w_{n-1}$ | $L_{n-1} \times \Delta w_{n-1}$ |

| point | shape | range | | required storage capacity |
|---|---|---|---|---|
| $P_1$ | $C_1$ | $R_1$ | | $\pi (R_1)^2$ |
| $P_2$ | $C_2$ | $M_2$ | $N_2$ | $M_2 N_2$ |
| ⋮ | ⋮ | ⋮ | | ⋮ |
| $P_i$ | $C_i$ | $S_i$ | $T_i$ | $\pi S_i T_i$ |
| ⋮ | ⋮ | ⋮ | | ⋮ |
| $P_n$ | $C_n$ | $D_n$ | | $(D_n)^2$ |

MAP INFORMATION SYSTEM FOR MOVING BODY

BACKGROUND OF THE INVENTION

1. Field of the Invention

The present invention relates to a map information display system for a moving body for extracting map information from a storage medium and displaying the map information.

2. Description of Related Art

A device such as that disclosed in Japanese Patent laid-open No. Hei. 7-83684 is known as a map information display device for extracting and displaying map information of a specified region. This device extracts map information in such a way that the size of the map information becomes smaller than the storage capacity of a memory when the size of map information set to be extracted by an operator of the map information display device is larger than the storage capacity of the memory in the device. The device extracts the map information by selecting a map from which part of a route selected by the operator is deleted or a map having a reduced scale, and stores the information into the memory.

However, since the above-described device of the related art removes part of a route set by the operator, the route or way points are updated. This causes a problem in that updating movement schedules or plans for a trip or a bike tour etc. is unavoidable. Furthermore, when the capacity of map information is reduced by selecting a reduced scale map, it will sometimes be the case that required map information is not included in the reduced scale map information. This causes a problem in that desired map information cannot be extracted.

SUMMARY OF THE INVENTION

The present invention has been conceived in view of the above mentioned problems, and an object of the invention is to provide a map information display system for a moving body that can extract and display desired map information without updating way points or routes set by an operator.

A map information display system for a moving body according to the present invention comprises coordinate information generating means for generating route point coordinate information representing points on a route being traveled by the moving body and on a scheduled route; limited region map information generating means for extracting map information for only a limited region based on the route point coordinate information from map information stored in a storage medium and including road information, and generating limited region map information; storage means for storing the limited region map information; and display means for displaying the stored limited region map information. The limited region map information generating means comprises route generating means for generating a moving body route based on the route point coordinate information and the road information; extracting means for setting map information of a strip-shaped region extending along the moving body route as the limited region map information; and strip-shaped region adjusting means for adjusting a size of the strip-shaped region so as to include the moving body route when it is determined that the information amount of the limited region map information is larger than a specified storage capacity less than a storage capacity of the storage means.

Specifically, according to one aspect of the present invention, when it is determined that the size of the limited region map information is larger than the storage capacity of the storage means, the size of the strip-shaped region is adjusted so as to include the moving body route. This means that it is possible to extract and display required map information without updating the route and way points set by the operator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

The present invention will now be described with reference to the accompanying drawings, wherein like reference numerals are used to identify the same or similar elements throughout the several views.

Figure 1:
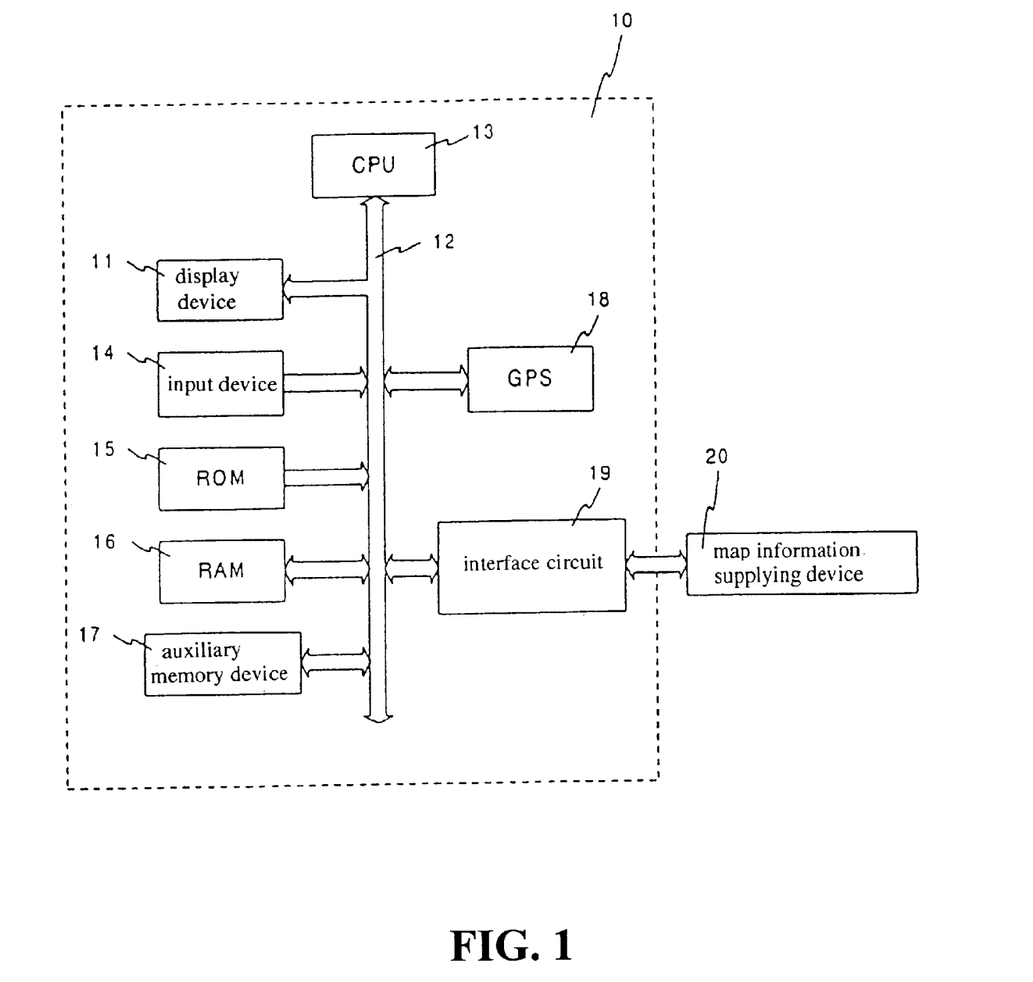
FIG. 1 is a block diagram illustrating a map information display system for a moving body according to the present invention.

FIG. 1 is a block diagram showing a map information display system for a moving body according to a first embodiment of the present invention. The map information display system for a moving body shown in FIG. 1 comprises a map information display device 10 for a moving body, for example a car mounted navigation system, and a map information supplying device 20, such as a CD-ROM drive or a DVD drive.

A display device 11 provided in the map information display device 10 for a moving body comprises, for example, a display (not shown) such as a CRT or a liquid crystal panel, a graphics memory (not shown), and a graphics controller (not shown). The display device 11 is connected to an input/output bus 12. The input/output bus 12 is configured so as to supply data signals and address signals into and out of a central processing unit 13 (hereinafter referred to as a CPU). The display device 11 displays map information provided via the input/output bus 12. An input device 14 is also connected to the input/output bus 12. Various commands input by an operator are sent to the CPU 13 from the input device 14. The input device 14 is constituted by a keyboard having a select key (not shown) for selection of items displayed on the display device 11 and cursor keys (not shown) for designating positions on a map displayed on the display device 11. Also connected to the input/output bus 12 are a ROM (read only memory) 15 and a RAM (random access memory) 16. The ROM 15 stores a program for generating limited region map-information and programs executed in response to commands input from the input device 14. On the other hand, limited region map information for display on the display device 11 and values of variables of programs to be executed are stored in the RAM 16. The RAM 16 is a memory that will not lose its stored contents even if a power supply is disconnected, for example, a non-volatile memory. An auxiliary memory device 17 can also be connected to the input/output bus 12, as shown in FIG. 1. The auxiliary memory device 17 comprises, for example, an IC card containing a non-volatile memory and an interface circuit (not shown) for the IC card. The auxiliary memory device 17 is used to store limited region map information having a large storage capacity that can not be held in the RAM 16

A GPS (global positioning system) device 18 is connected to the input/output bus 12. The GPS device 18 detects an absolute position of the moving body from longitude and latitude information, and displays a mark representing the current point of the map information display system for the moving body based on the position data by overlaying the mark on a map being displayed by the display device 11.

The map information providing device 20 is a CD-ROM drive or a DVD drive for reading out map information stored on a non-volatile storage medium such as, for example, a CD-ROM or a DVD. This map information stored in the CD-ROM or DVD is read out in response to commands from the CPU 13, and is supplied to the input/output bus 12 via an interface circuit 19.

In the first embodiment, the map information display system for a moving body is constituted by the map information display device 10 for a moving body and the map information supplying device 20. Coordinate information generating means is constituted by the input device 14, limited region map information generating means, route generating means, and extracting means. Strip-shaped region adjusting means are constituted by the input/output bus 12, the CPU13 and the ROM 15. Display means is constituted by the display device 11. Furthermore, current position coordinate detecting means is constituted by the GPS device 18.

In the following description, the map information display system is started up, and enters a steady operation after initial processing to initialize variables used by the CPU 13, etc.

Figure 2:
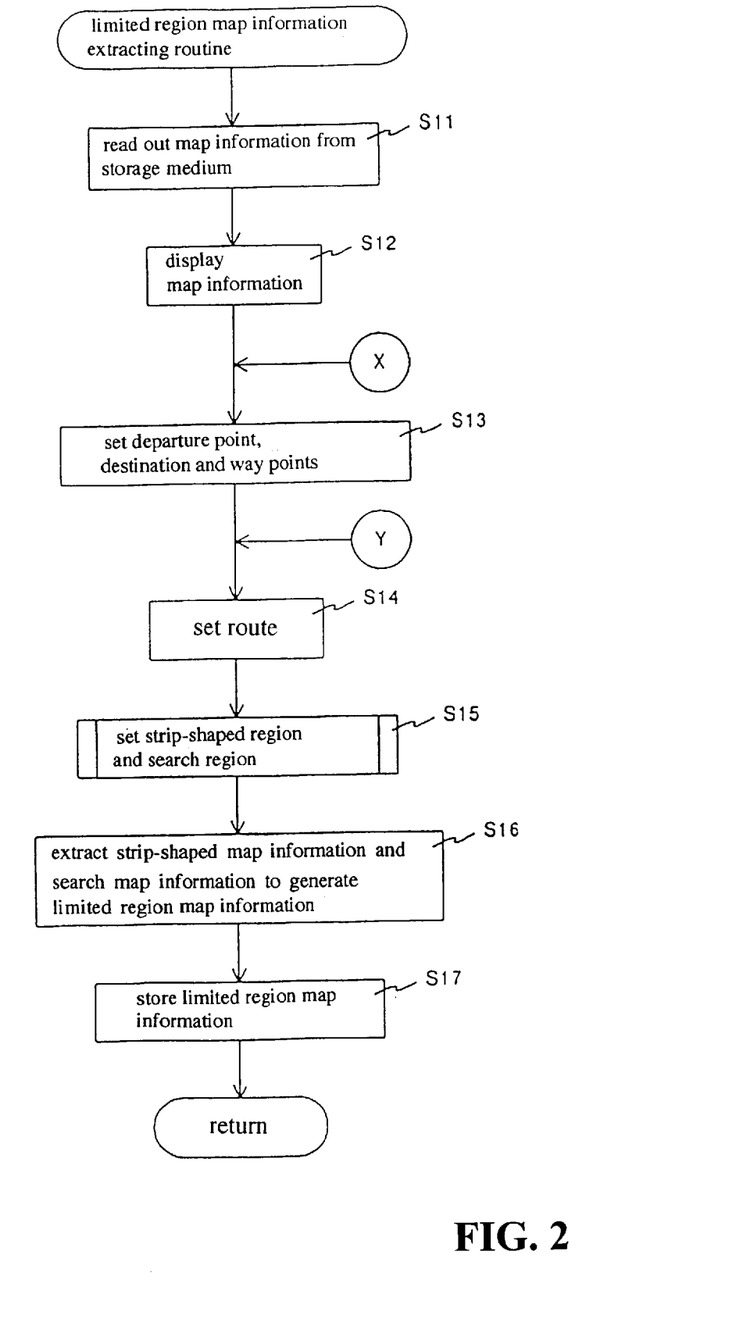
FIG. 2 is a flowchart illustrating a subroutine for extracting limited region map information.

FIG. 2 is a flowchart showing a subroutine for extracting and generating limited region map information. First of all, map information stored in the non-volatile storage medium is read out from the map information supplying device 20 in response to key input from the input device 14 by the operator (Step S11). The read out map information is displayed on the map display device 11 (step S12).

The setting of departure, destination and way points from the input device 14 (step S13) will now be described. This point setting step is accomplished using key input of coordinate data of the various points, for example longitude and latitude data. The input operation is carried out by, for example, displaying a pointer, for example a cross or arrow shaped pointer, for designating points on a map so as to overlay the map on the display device 11 displaying the map, and moving this pointer using cursor keys to designate points. When a plurality of place names exist in the vicinity of a designated point, these place names are displayed on the display device 11 and one place name can be selected using the select key. By deciding on a single place name, a single coordinate is then obtained corresponding to this place name. In order to simplify the input operation and to make the display easy to see, it is also possible to provide functions of enlarging or reducing the map displayed on the display device 11 using other key inputs. In the following, the point of departure is designated $P_1$, the point of destination is designated $P_n$, and way points are designated $P_2, \ldots P_i, \ldots P_{n-1}$. Furthermore, sections between two connecting points, such as $P_1$~$P_2$ or $P_i$~$P_{i-1}$ are referred to as two-point sections.

Next, a route along which the moving body will travel is searched for on a map being displayed on the display device 11 from coordinate information and road information included in the map information for $P_1$~$P_n$, and set (step S14). The route search can use a well known method, such as the method disclosed in Japanese patent laid-open No. Hei. 7-55481 or Japanese Patent laid-open No. Hei 7-91971. When there are a plurality of routes that can be selected for two-point sections, this route search displays the plurality of routes on the map, and selection is carried out by displaying a pointer on the display device 11 and using cursor keys, as described above. In the following, respective routes set for respective two-point sections are called $r_i$ (i=1, ... n–1), so that, for instance, a route set for two-point section $P_1$~$P_2$ is $r_1$, a route set for two-point section $P_i$~$P_{i-1}$, is $r_i$, and a route set for two-point section $P_{n-1}$~$P_n$ is $r_{n-1}$.

Next, a region setting sub-routine shown in FIG. 3 and which will be described later is called, and a strip-shaped region and a search region are set (step S15). Furthermore, strip-shaped map information and search map information are extracted from the set strip-shaped region and search region to generate limited region map information (step S16). The generated limited region map information is stored in the auxiliary memory device 17 (step S17), and this sub-routine is terminated.

Figure 3:
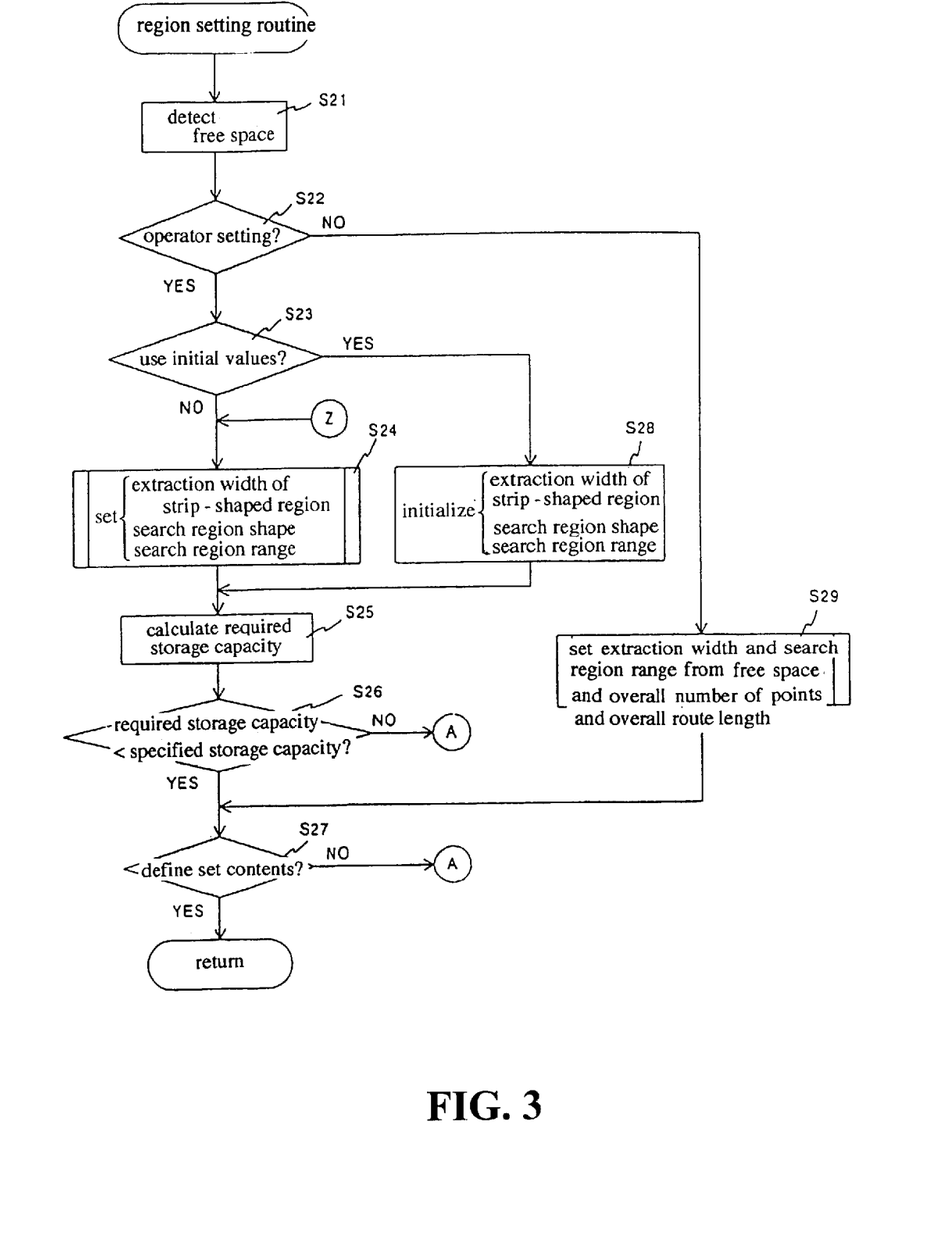
FIG. 3 is a flowchart illustrating a subroutine for setting a strip-shaped region and a search region.

FIG. 3 shows a sub-routine for setting the strip-shaped region and the search region. This sub-routine is executed when it is called in step S15 as described above first of all, free space in the auxiliary memory device 17 is detected (step S21). If the auxiliary memory device 17 is a removable memory, for example, a device such as an IC card in which memory can be mounted, then map information can be generated according to the storage capacity, even if memory having a different storage capacity is used.

Next, a command prompting the operator to select whether or not the operator will set an extraction width of the strip-shaped region and a shape and range of the search is displayed on the display device 11 (step S22). When the operator has provided key input to select that the operator will carry out the setting, a command asking whether or not initial values will be used is displayed on the display device 11 to prompt key input from the operator (step S23). These initial values set, for example, the extraction width to 2 km, the shape of the search region to a circle and the radius of the search region range to 4 km, as will be described later, and are stored in advance in the ROM 15.

When it is selected to not use the initial values, a subroutine for setting the region range shown in FIG. 4, and which will be described later, is called and executed. The extraction width of the strip-shaped region and the shape and range of the search region are set (step S24). Next, the storage capacity required to generate map information from the set strip-shaped region and search region is calculated (step S25), and it is judged whether or not this required storage capacity is smaller than a specified storage capacity, for example the free space obtained in step S21 or the size of map information desired by the operator (step S26). When it is determined that the required storage capacity is smaller than the specified storage capacity, a command prompting the operator to select whether or not revision is required to the contents set up to this point is displayed on the display device 11 (step S27). If revision to the set content not required is selected this subroutine terminates. On the other hand, if it is determined in step S26 that the required storage capacity is equal to or greater than the specified storage capacity, or if revision to set content is selected in step S27, processing advances to a revision selection routine shown in FIG. 6, and which will be described later, for revising the set contents.

In step S23 described above, if use of initial values is selected, the initial values stored in advance in the ROM 15 are read out. For example, the extraction width is set to 2 km, the shape of the search region is set to a circle and the diameter of the search region range is set to 4 km (step S28), and the above described steps S25–S27 are executed.

If, in step S22, it is selected that the operator will not set the extraction width of the strip-shaped region and the shape and range of the search region, the automatic setting routine of FIG. 5, and which will be described later, is called and executed (step S29). After that, processing advances to the above described step S27.

When limited region map information is to be acquired via a communication line such as a telephone line, the specified storage capacity for step S26 can be a size determined based on a transmission rate of the communication line and a desired communication time. When the limited region map information is generated so as not to be bigger than the specified storage capacity determined in this way, it is possible to acquire the limited region map information via the communication line within the desired communication time.

Figure 4:
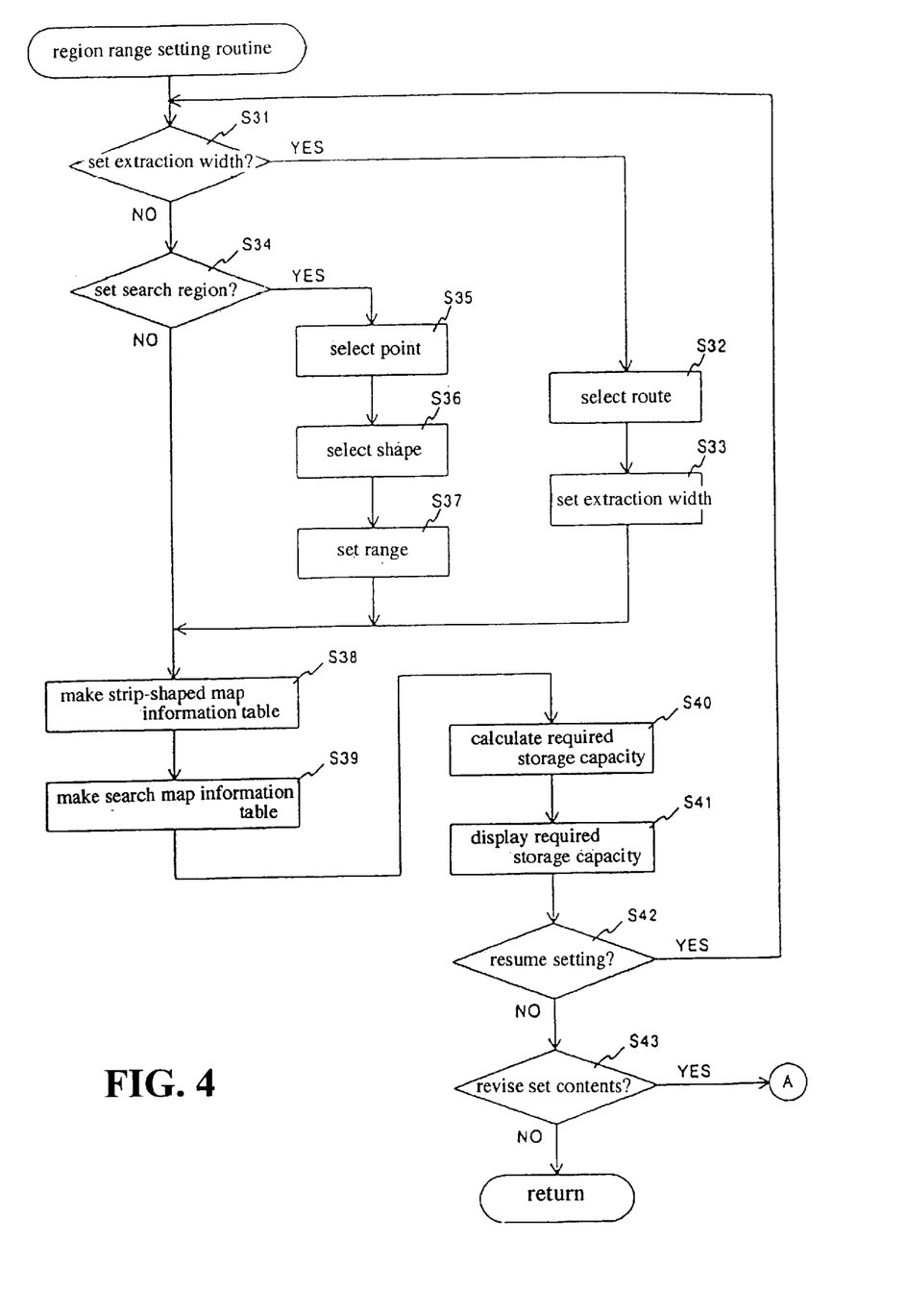
FIG. 4 is a flowchart illustrating a subroutine for setting a strip-shaped region extraction width and a search region shape and range.

FIG. 4 shows a subroutine for setting the strip-shaped region extraction width, and the shape and range of the search region. As described above, this subroutine is called and executed in step S24 of FIG. 3 First of all, a command prompting the operator to select whether or not the operator will set the extraction width of the strip-shaped region is displayed in the display device 11 (step S31). When it is selected that the extraction width will be set, the operator selects a route the extraction width will be set for by inputting numerical values from 1 to n−1 representing a route $r_i$ (i=1, . . . n−1) from a ten-key pad of the input device 14 (step S32). This route selection can be carried out for a plurality of routes at the same time. Next, the operator inputs extraction width for the extraction width to be set of the selected route in numerical values in units of kilometers from the ten-key pad provided on the input device 14 (step S33). It is also possible to set the extraction width to zero, and in this case map information of the strip-shaped region is not extracted. In step S14, only road information for the set route is extracted. It is less likely that strip-shaped map information or search map information will be required when roads that do not branch or expressways are selected in the route $r_i$, which means that that by setting the extraction width to zero it is possible to make the required storage capacity for the limited region map information to be generated small. In the following, the extraction width for each route $r_i$ is called $\Delta w_i$ (i=1, . . . n−1), for instance, the extraction width for route $r_i$ is called $\Delta w_i$, and the extraction width for route $r_{n-1}$ is called $\Delta w_{n-1}$.

Furthermore, when it has been selected to not set the extraction width in step S31, a command prompting the operator to select whether or not the operator will set the shape and range of the search region is displayed on the display device 11 (step S34). When it is selected to set the shape and range of the search region, the operator selects a point by inputting a numerical value from 1 to n representing point $P_i$ (i=1, . . . , n) on the ten-key pad of the input device 14 (step S35). This point selection can also select a plurality of points at the same time. Next, the shape of the search region for point $P_1$ is selected (step S36) by the operator inputting a shape number $C_i$ (i=0, . . . , 3) on the ten-key pad of the input device 14. This shape number $C_1$ represents, for example, that a circle is selected when i=0, that a rectangle is selected when i=1, that an ellipse is selected when i=2, and that a square is selected when i=3. Making it possible to select the shape of the search region means that it is possible to extract map information according to the required search region. Next, the range of the search region is set according to the selected shape (step S37). This search region range setting is, for example, setting of a radius when a circle is selected, setting of the height and width when a rectangle is selected, setting of a long diameter and a short diameter when an ellipse is selected, or the setting of the length of one side when a square is selected. This setting is carried out by the operator inputting numerical values in units of kilometers on the ten-key pad of in the input device 14. In the following, with respect to a point $P_i$, when a circle is selected the radius is designated $R_i$, when a rectangle is selected the width is designated $M_i$ while the height is designated $N_i$, when an ellipse is selected the long diameter is designated $S_i$ and the short diameter is designated $T_i$, and when a square is selected the length of one side is designated $D_i$, and these lengths are called region dimensions.

Figure 7:
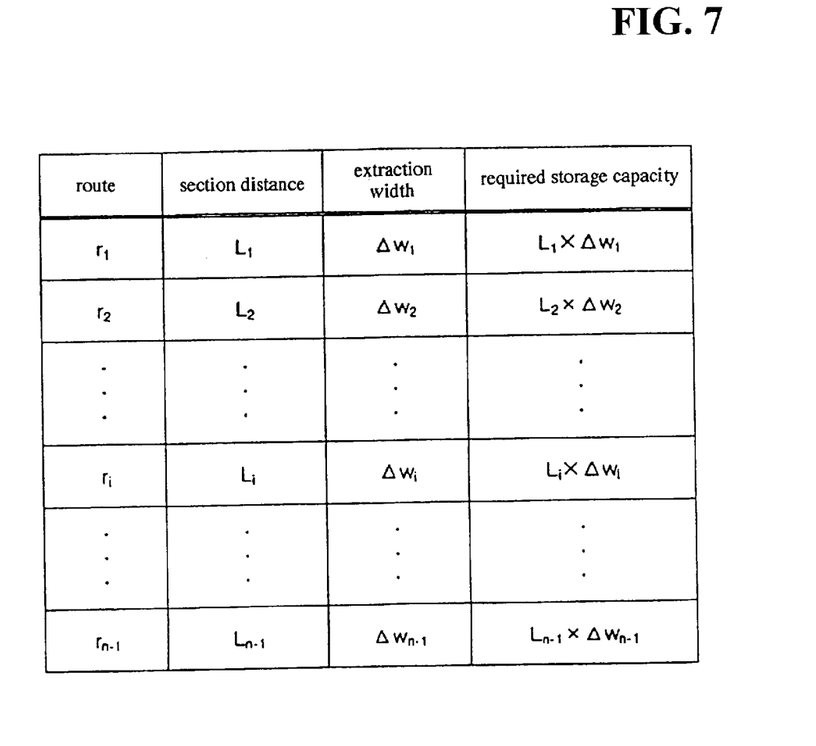
FIG. 7 illustrates a strip-shaped map information table generated in RAM 16 from set contents.

Next, a strip-shaped region map information table is created in the RAM 16 from the above described set contents (step S38), as shown in FIG. 7 and as will be described later. FIG. 7 shows a set route $r_i$ (i=1, . . . , n−1) in a first column, a section distance $L_i$ (i=1, . . . , n−1) for each route $r_i$ in a second column, an extraction width $\Delta w_i$ (i=1, . . . , n−1) for each route $r_i$ in a third column, and a required storage capacity $L_i \times \Delta w_1$ (i=1, . . . , n−1) for each route $r_i$ calculated by multiplying the section distance $L_i$ by the extraction width $\Delta w_i$ in a fourth column. The above mentioned section distance is obtained from road information contained in the map information. The size of the map information is determined by the area of the region, the storage capacity required for the map information is obtained by calculating the area of the region; and the storage capacity required for the strip-shaped map information is obtained by calculating the total of all the storage capacities shown in column 4 of FIG. 7.

Figure 8:
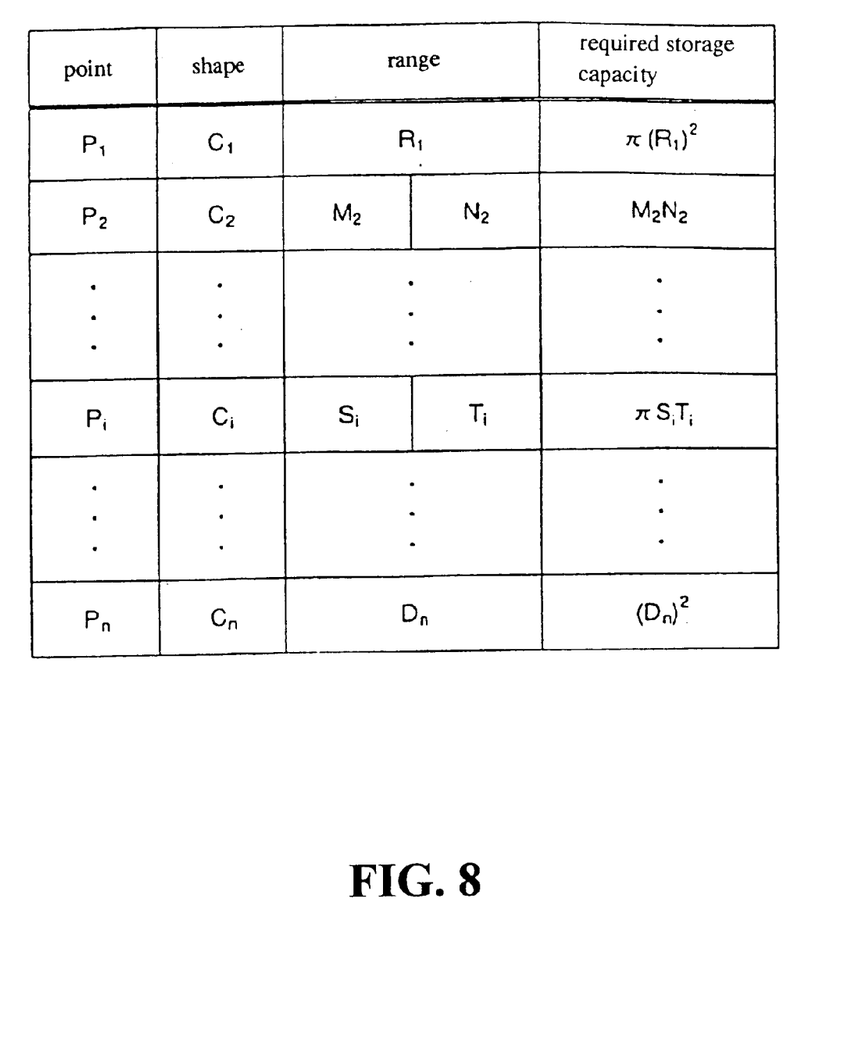
FIG. 8 illustrates a search map information table generated in RAM 16 from set contents.

After processing in step S38 in FIG. 4 has been executed, a search map information table, as shown in FIG. 8 and as will be described later, is created in the RAM 16. FIG. 8 shows a set point $P_i$ (i=1, ..., n) in a first column, a shape number $C_i$ (i=1, ..., 3) for each point $P_i$ in a second column, region dimensions depending on the shape for each point $P_i$ in a third column, and a required storage capacity for each point $P_i$ calculated from the region dimensions in a fourth column. In the search map information table shown in FIG. 8, for point $P_1$, a circle is selected, a radius $R_1$ is set as the region dimension, and the required storage capacity is calculated as $\pi(R_1)^2$. Furthermore, for point $P_2$, a rectangle is selected, a width $M_2$ and a height $N_2$ are set as region dimensions, and the required storage capacity is calculated as $M_2N_2$. For point $P_i$ an ellipse is selected, a long diameter $S_i$ and a short diameter $T_i$ are set as region dimensions, and the required storage capacity is calculated as $\pi S_i T_i$. Finally, for point $P_n$ a square is selected, a length of one side $D_n$ is set as the region dimension, and the required storage capacity is calculated as $(D_n)^2$. The required storage capacity for the search map information is obtained by calculating the total of all the storage capacities shown in column 4 of FIG. 8.

Next, the total required storage capacity for the currently set content is calculated from the strip-shaped map information table and the search map information table created in steps S38 and S39 (step S40). The result is displayed on the display device 11 (step S41). This display consists of, for example, displaying the total storage capacity of memory housed in the auxiliary memory 17, required storage capacity at the current point in time, free space at the current point in time, or ratio of total storage capacity to current free space, etc. at a lower part of the screen of the display device 11. By displaying this type of information on the display device 11, it is possible for the operator to determine whether or not the size of the map information is appropriate, even during setting operations.

Next, a command asking whether or not setting is to be resumed is displayed in the display device 11 to prompt the operator for key input (step S42). When setting is to be resumed, processing returns to step S31, and the setting as described above is repeated. When setting is to be terminated, a command asking whether or not the set contents are to be revised is displayed on the display device 11 to prompt the operator for key input (step S43). When the set contents are not to be updated, this subroutine terminates, but if the set contents are to be revised, processing transfers to step S61 in FIG. 6, as will be described later.

As described above, display is carried out of the required storage capacity and the free space during setting of set contents such as the extraction width etc. By also making it possible to update the set contents during setting, it is possible to immediately revise the set contents when the operator determines that the size of the map information is not appropriate, for example when the amount of map information is more than the operator expected.

Figure 5:
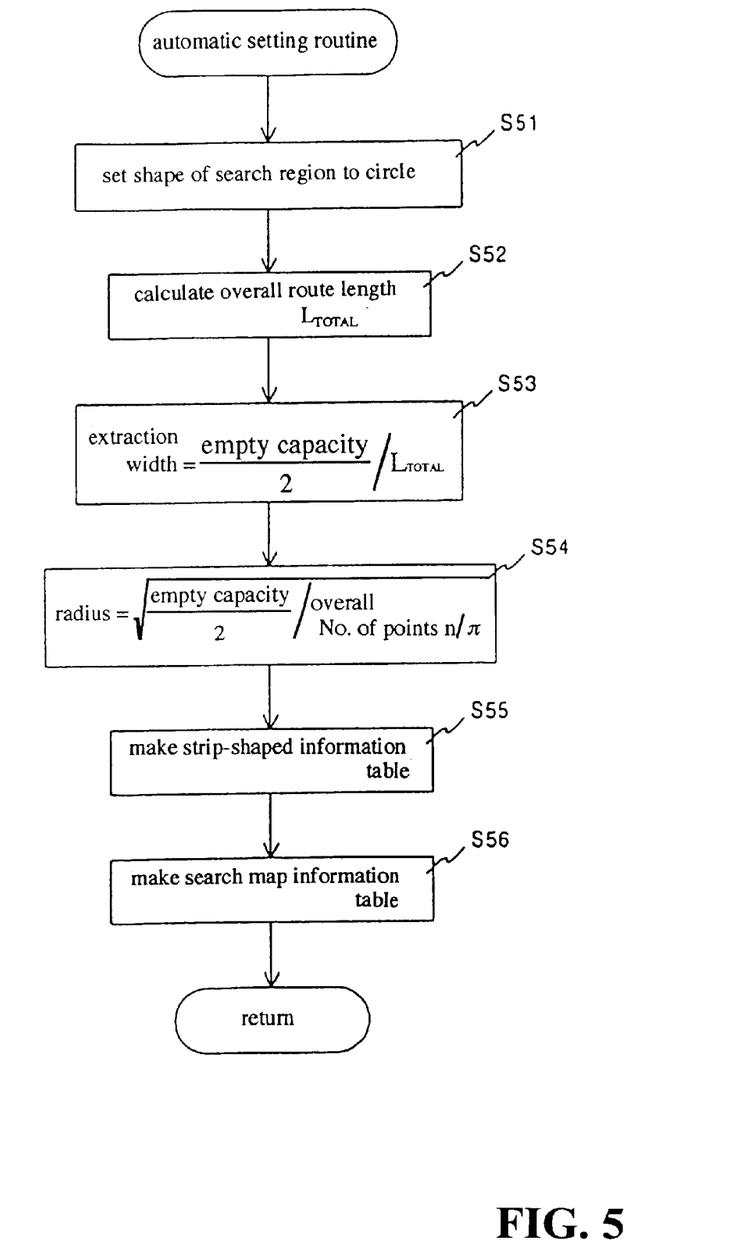
FIG. 5 is a flowchart illustrating a subroutine for calculating a strip-shaped region extraction width and a search region shape and range from empty capacity, overall route length and total number of points.

FIG. 5 shows a subroutine for calculating the extraction width of the strip-shaped region and the shape and range of the search region from free space, total route length and overall number of points. This subroutine, as described above, is executed when called in step S29 of the subroutine shown in FIG. 3.

First of all, the search region shape is set to a circle for all points $P_i$ (i=1, ..., n) (step S51) and the overall length of the route $L_{TOTAL}$ is calculated from road information (step S52). This overall route length $L_{TOTAL}$ is equal to the total of the section distances $L_i$ (i-1, ..., n-1) shown in column 3 of FIG. 7.

Next, the extraction width of the strip-shaped region is set to a value obtained by dividing a value of half of the free capacity of the auxiliary memory 17 detected in step S21 of FIG. 3 by the overall route length $L_{TOTAL}$ (Step S53). The value of half of the free capacity is then divided by the overall number of points n and then further divided by $\pi$, with the square root of this result being set as the radius of the search region (step S54).

Next, similarly to steps S38 and S39 in FIG. 4, a strip-shaped map information table and a search map information table are created, as shown in FIG. 7 and FIG. 8 (steps S55 and S56) and this subroutine terminates.

In the above described subroutine, the strip-shaped map information and the search map information are generated by allocating half of the free capacity of the auxiliary memory device 17 to the strip-shaped map information and allocating the remaining half to the search region map information. The strip-shaped map information is generated with the strip-shaped region extraction width the same across all routes. That is, the strip-shaped map information table shown in FIG. 7 is created assuming that $\Delta W_1 = \ldots = \Delta W_i = \ldots = \Delta W_{n-1}$ to generate strip-shaped map information. Furthermore, the search map information is generated assuming that the radius of a circular search region is the same for all cases. That is, the search map information table shown in FIG. 8 is created assuming that $R_1 = \ldots = R_i = \ldots = R_n$, to generate search map information.

The above-mentioned subroutine carries out setting so that the storage capacity required by the strip-shaped map information and the storage capacity required by the search map information are the same. However, it is also possible to carry out setting so that the two storage capacities are different from one another. Furthermore, instead of having the same extraction width of the strip-shaped region, it is possible to carry out setting with varied extraction widths. In addition, it is possible for the shape of the search region to be a shape other than a circle, and setting can be carried with varied radii instead of with the same radius.

Figure 6:
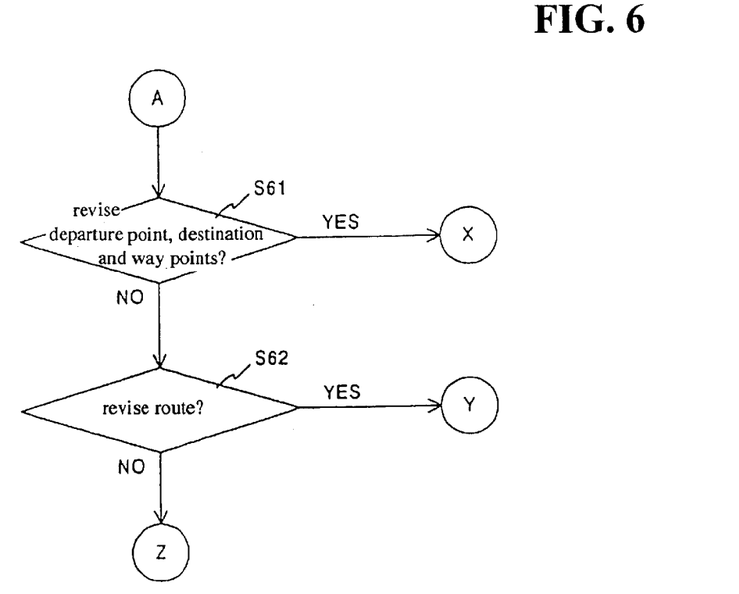
FIG. 6 is a flowchart illustrating a subroutine for revision selection.

FIG. 6 shows a subroutine for selecting revision that is called when it is determined in step S26 of FIG. 3 that the required storage capacity is greater than a specified storage capacity, or when it has been selected that revision of the set contents is necessary in step S27 of FIG. 3 or step S 43 of FIG. 4.

First, a command prompting the operator to select whether or not revision of the departure, destination or way points is to be carried out is displayed on the display device 11 (step S61). When it is selected that the departure, destination or way points are to be revised, the process transfers to step S13 in FIG. 2. On the other hand, when it is selected that the departure, destination or way points are not to be revised, a command prompting the operator to select whether or not the route is to be revised is displayed on the display device 11 (step S62). When it is selected to revise the route, processing transfers to step S14 in FIG. 2. When it is selected that the route is not to be revised, processing transfers to step S24 in FIG. 3 to revise the extraction width of the strip-shaped map region, or shape or range of the search map region.

It is also possible to have a further step of selecting a reduced scale level in the above-described revision selection routines. With this type of arrangement, it is possible to extract map information at different reduced scales for specified strip-shaped regions or search regions, and it is possible to alter the required storage capacity of limited region map information to be generated.

Figure 9:
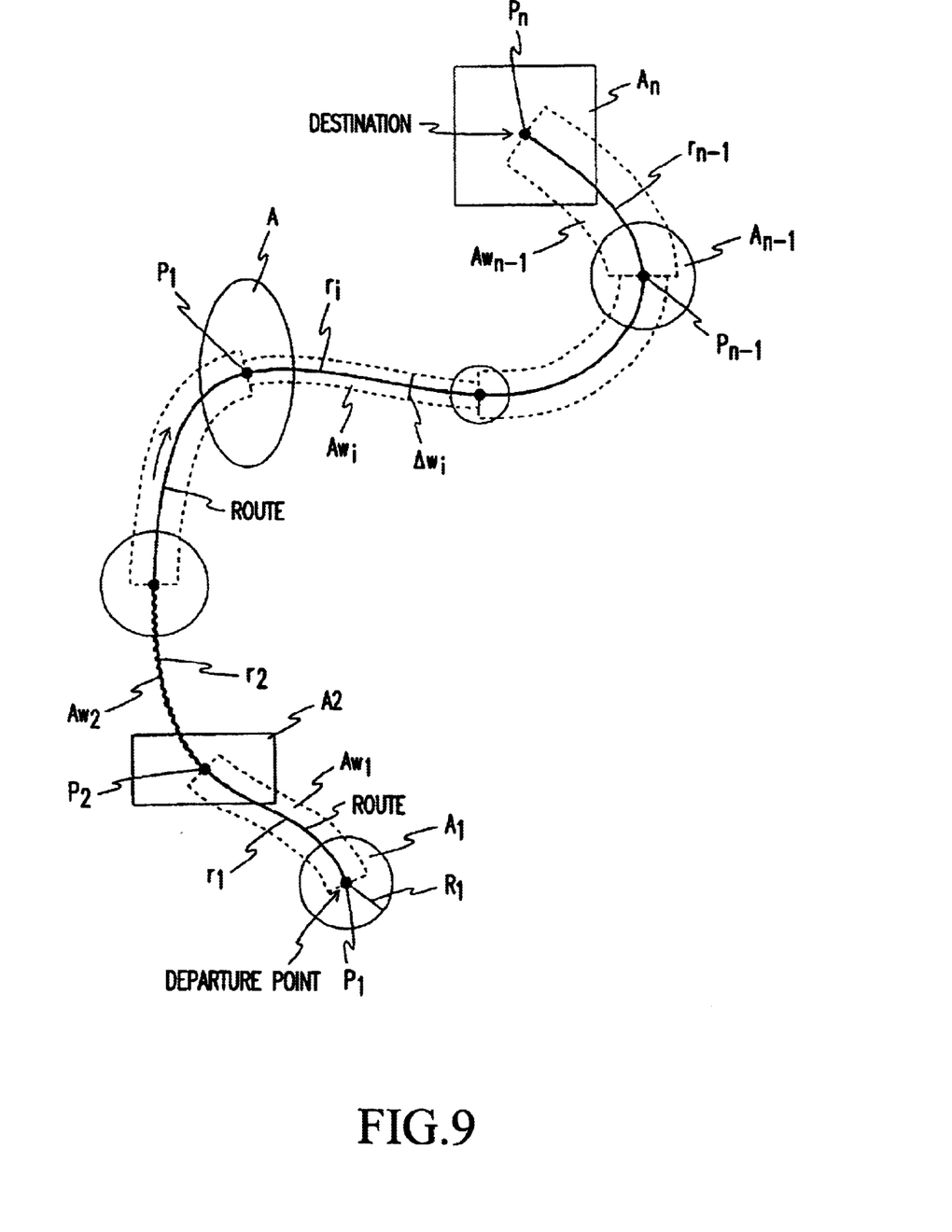
FIG. 9 illustrates one example of limited region map information that has been generated using the limited region map information extraction routine.

FIG. 9 is a drawing showing an example of limited region map information that has been generated using the above described limited region map information extraction routine.

In the drawing, departure point $P_1$, destination $P_n$ and way points $P_2$-$P_{n-1}$ are shown by black dots, and routes $r_i$-$r_{n-1}$ are shown by a thick line. Furthermore, strip-shaped regions $Aw_1$-$Aw_{n-1}$ are shown as regions surrounded by a dotted line, and respective search regions $A_1$-$A_n$ are shown as regions surrounded by a solid line having a specified shape with points $P_1$-$P_n$ at the center. In FIG. 9, cases are shown of a search region $A_1$ having a circular shape, a search region $A_2$ having a rectangular shape, a search region $A_1$ having an elliptical shape and a search region $A_n$ having a square shape, corresponding to the search map information table shown in FIG. 8. In route $R_2$, a case is shown where the extraction width $\Delta W_2=0$ has been set. In this case, as has been described above, the map information for the strip-shaped region is not extracted and only road information for route $R_2$ is extracted.

As has been described above, by having an arrangement where the size of a strip-shaped region or a search region is changed to generated limited region map information, it is possible to extract required map information by reducing the storage capacity required by the limited region map information without changing way points and routes set by the user.

Figure 10:
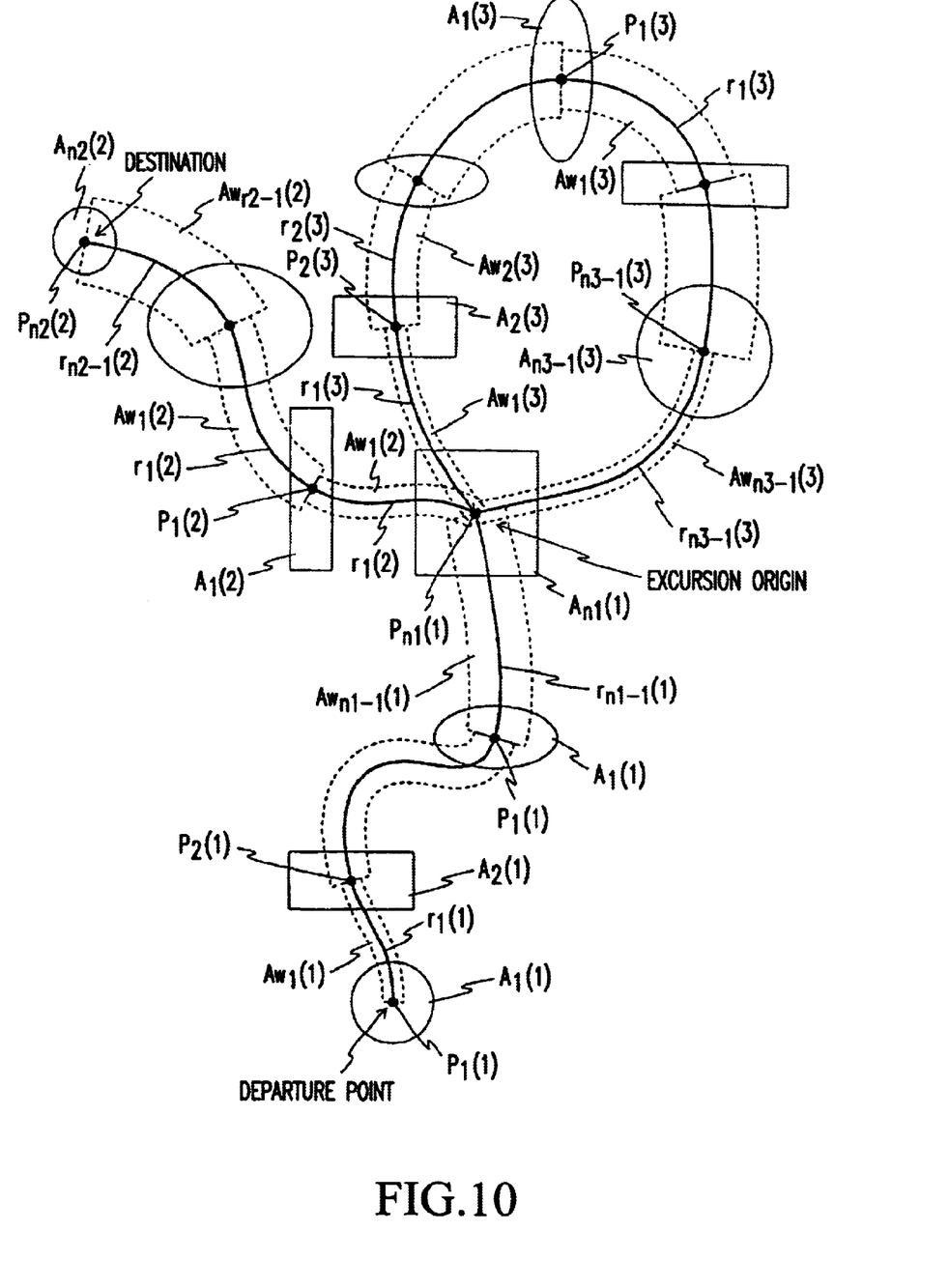
FIG. 10 illustrates one example of a set of limited region map information that has been generated using the limited region map information extraction routine.

FIG. 10 is a drawing showing another example of limited region map information generated by the limited region map information extracting routine described above. In FIG. 9 described above, an example is given of a case where map information was generated for only one limited region, but in the example shown in FIG. 10 a case is shown where map information is generated for three limited regions. Similarly to FIG. 9, departure, destination and way points are shown by black dots, routes are shown by thick lines, respective strip-shaped regions are shown as regions surrounded by a dotted line, and respective search regions are shown as regions surrounded by a solid line.

A route from the departure point to an excursion origin is shown by respective points $P_i$ (1) (i=1, . . . , n1). The "1" shown inside the parenthesis of $P_i$ (1) indicates generation of map information for a first limited region, and $P_i$ (1) represents points included in the first limited region map information. Furthermore, n1 is the largest point number included in the first limited region map information. The route from the departure point to the excursion origin is represented by $r_i$ (1) (i=1, . . . , n1-1), the strip-shaped regions are represented by $Aw_i$ (1) (i=1, . . . n1-1), and the search regions are represented by $A_i$ (1) (i=1, . . . , n1). Here, the "1" shown in the parenthesis of $r_i$ (1), $Aw_i$ (1) and $A_i$ (1) indicates that information is generated for a first limited region, as described above, and n1 is the largest number of a point included in the first limited region map information.

A route from the excursion origin to the destination is shown by respective points $P_i$ (2) (i=1, . . . , n2) and the route is represented by $r_i$ (2) (i=1, . . . n2-1), the strip-shaped regions are represented by $Aw_i$ (2) (i=1, . . . , n2-1), and the search regions are represented by $A_i$ (2) (i=1, . . . , n2). Here, the "2" shown in the parenthesis indicates that information is generated for a second limited region, as described above, and n2 is the largest number of a point included in the second limited region map information.

A route shown in FIG. 10 starting from and returning to the excursion origin is shown by respective points $P_i$ (3) (i=1, . . . , n3) and the route is represented by $r_i$ (3) (i=1, . . . , n3-1), the strip-shaped regions are represented by $Aw_i$ (3) (i=1, . . . , n3-1), and the search regions are represented by $A_i$ (3) (i=1, . . . , n3). Here, the "3" shown in the parenthesis indicates that information is generated for a third limited region, as described above, and n3 is the largest number of a point included in the third limited region map information.

Also in the case of generating sets of limited region map information as shown in FIG. 10, the user can know the required storage capacity and the free space while set contents such as the extraction width are being set. It is possible make the size of limited region map information sets appropriate.

In the case where sets of limited region map information are generated, when the limited region map information is stored in step S17 of FIG. 2 described above, it is possible to add a step of inputting an identifier such as a file name in order to identify the respective limited region map information sets, and store the limited region map information in the auxiliary memory 17. Also, in the case where limited region map information sets are stored, the user inputs the above-described identifier from the input device 14 and a limited region map information set corresponding to the identifier is readout from the auxiliary memory device 17 and displayed on the display device 11.

In step S26 of FIG. 3 described above, since it is judged whether or not the required storage capacity for the respective limited region map information steps is smaller than the specified storage capacity, it is possible to determine whether or not the required storage capacity has the size of a specified storage capacity, for example a size desired by the operator, for each limited region map information.

Figure 11A:
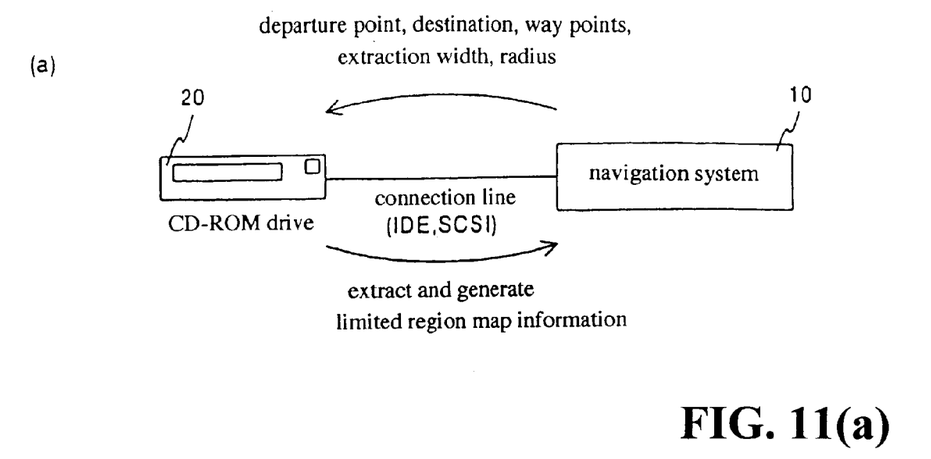
FIGS. 11(a) and 11(b) are schematic diagrams illustrating a first embodiment and a second embodiment of the present invention.
Figure 11B:
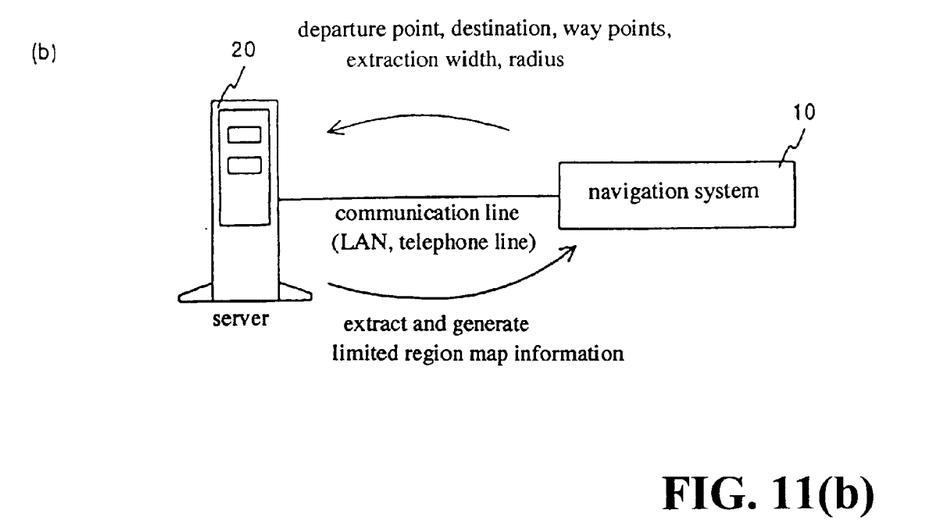

FIG. 11 shows first and second embodiments of the present invention. FIG. 11(a) is a schematic diagram showing the map information display system for a moving body according to the first embodiment of the present invention described above In this case, the map information supplying device 20 is an external auxiliary storage device such as a CD-ROM drive or a DVD drive. On the other hand, the map information display device 10 is a vehicle mounted navigation system, for example, and has a connector for connecting to a specified interface circuit for connecting to the external auxiliary storage device, such as an IDE or SCSI interface circuit (not shown). The operator inserts a storage medium of the external auxiliary storage device storing map information of a specified region, for example, in the case of a CD-ROM drive, a CD-ROM (not shown), into the external auxiliary storage device, operates the keyboard provided in the vehicle navigation system in the sequence described above in FIG. 2–FIG. 6 to create limited region map information, and causes the limited region map information to be stored in storage means provided inside the vehicle navigation system, for example a non-volatile RAM. When the operator moves, for example, when touring on a motorcycle, only the vehicle navigation system storing the limited region map information is loaded onto the motorcycle.

FIG. 11(b) is a schematic diagram showing a map information display system for a moving body according to the second embodiment of the present invention, and shows a case where a server supplying map information, for example a server providing map information on the internet, is used as the map information providing device. The vehicle navigation system, being the map information display device, has a communication interface circuit (not shown) for communicating with the server over a communication line such as a local area network (hereinafter called a LAN) or a telephone line. After limited region map information has been generated by following the above described sequence in FIG. 2 to FIG. 6, the limited region map information is downloaded from the server to the vehicle navigation system, and the limited region map information is stored in storage means provided inside the vehicle navigation system, such as a non-volatile RAM. When the operator moves, the vehicle only needs to have the vehicle navigation system storing the limited region map information. With this second embodiment, the vehicle navigation system, being the map information display device, contains all of the coordinate information generating means, the limited region map information generating means, display means and storage means.

Figure 12A:
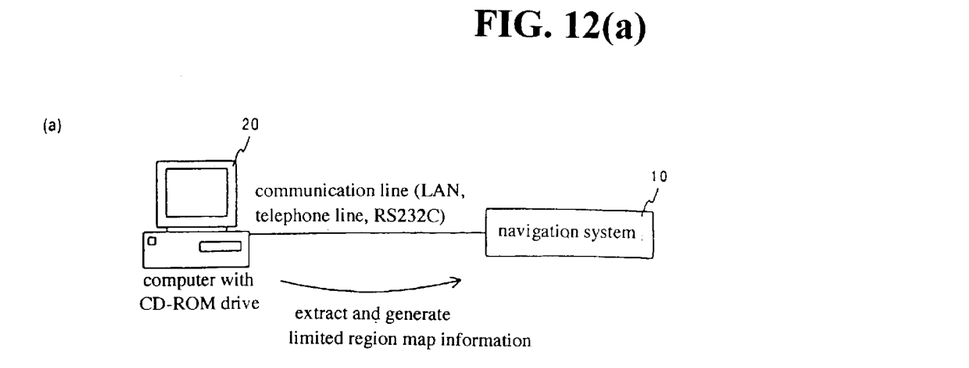
FIGS. 12(a), 12(b), and 12(c) are schematic diagrams illustrating a third embodiment and a fourth embodiment of the present invention.
Figure 12B:
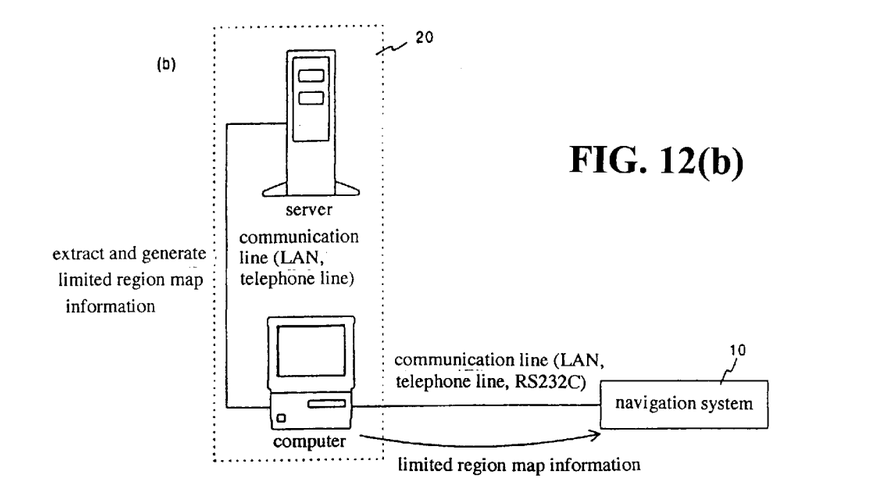
Figure 12C:
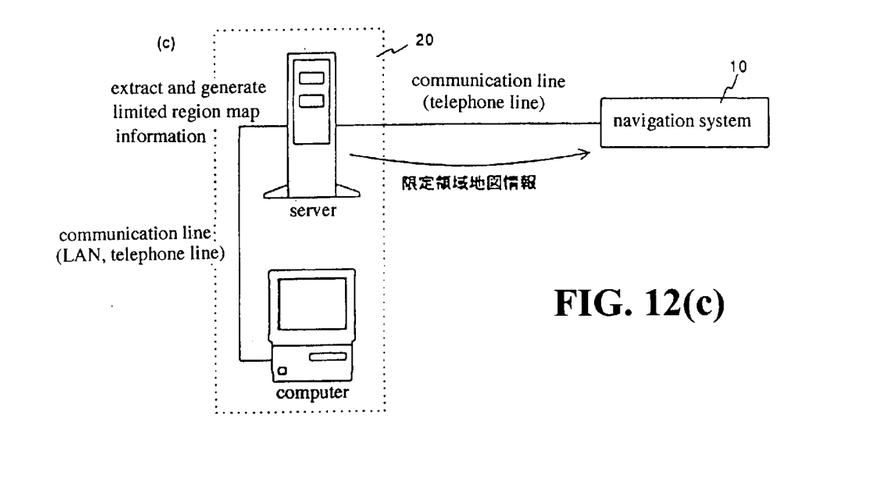

FIG. 12 shows a third and fourth embodiment of the present invention. FIG. 12(a) is a schematic diagram showing the map information display system for a moving body of the third embodiment of the present invention, or the map information display system for generating limited region map information using a device other than a vehicle navigation system. The device for generating the limited region map information is, for example, a computer having a built-in CD-ROM drive. The operator inserts a CD-ROM (not shown) storing map information for a specified region into the CD-ROM drive. After map information has been displayed on a display connected to the computer, a keyboard or mouse of the computer is operated to generate the limited region map information on the computer as in the sequence described for FIG. 2 to FIG. 6. After that, the computer is connected to a vehicle navigation system, being a map information display device capable of communicating with the computer, using specified connection means, such as a LAN, a telephone line or a serial communication line, and the generated limited region map information is stored in a storage device inside the vehicle navigation system, such as a RAM. As has been described above, when the operator moves, the vehicle only needs to have the vehicle navigation system storing the limited region map information. It is also possible for the generated limited region map information to be stored on a server, for example, an internet server. With this type of arrangement, even before the operator moves it is possible to connect the vehicle navigation system to a server via a communication line and store the limited region map information in the vehicle navigation system.

FIG. 12(b) is a schematic diagram showing the map information display system of the fourth embodiment of the present invention, and similarly to FIG. 12(a) shows a map information display system for generating limited region map information using a device other than a vehicle navigation system.

Map information to be used in the generation of limited region map information is stored on a server, for example, an internet server. Map information is displayed on a display of a computer connected to this server via a communication line such as a LAN or telephone line, and limited region map information is generated using the sequence described above in FIG. 2 to FIG. 6 by operation of a keyboard or mouse of the computer. After that, the computer is connected to a vehicle navigation system, being a map information display device capable of communicating with the computer, using specified connection means, such as a LAN, a telephone line or a serial communication line, as describe above, and the generated limited region map information is stored in a storage device inside the vehicle navigation system such as a RAM. With this type of arrangement, when the generated limited region map information is displayed on the vehicle navigation system the operator can move around and only needs to have the vehicle navigation system. Also, in this case, as shown in FIG. 12(c), the generated limited region map information can be supplied to a server, such as an internet server.

FIG. 12(c) has the same reference numerals attached to structural elements that correspond to those shown in FIG. 12(b). With this type of arrangement, by using the communication capability of the vehicle navigation system to connect the vehicle navigation system to the server through a communication line such as a telephone line, the operator can obtain generated limited region map information before setting off or while moving.

In the above described third and fourth embodiments, when the generated limited region map information is supplied to a server, it is not necessary for all of the limited region map information to be stored in the vehicle navigation system, and it is possible to obtain only the limited region map information for a region required at the time of moving from the server and display that information. With this arrangement, it is possible to make the storage capacity of the storage device in the vehicle navigation system, such as the RAM, even smaller.

In the above described embodiments, a vehicle navigation system has been given as an example of the map information display device for a moving body, but the present invention is not limited to a vehicle navigation system, and any device can be used that moves with travel of the moving body.

Also, in the above described embodiments, the case has been shown where map information has been extracted as a fixed width $\Delta w_i$ for a two-point section, but it is also possible to extract map information so that the extraction width $\Delta w_i$ varies according to the position on the route, and to thus generate strip-shaped map information.

Also in the above described embodiments, the case has been shown where the shape of the search region has been selected from specified shapes, but it is also possible for to have an arrangement where the operator can set any desired shape.

In the present specification, the term "strip-shaped region" means a stretched region running along a route. The two ends of the region need not be rectangular and can be various shapes, for example semicircular or elliptical.

As has been described above, according to the map information display system for a moving body of the present invention, when it is determined that the size of limited region map information is larger than the storage capacity of storage means a strip-shaped region including the route of the moving body is adjusted which means that map information van be extracted and displayed without the need for the operator to change way points or routes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A map information display system for a moving body, comprising:

coordinate information generating means for generating route point coordinate information representing points on a route being traveled by the moving body and on a scheduled route;

limited region map information generating means for extracting map information for only a limited region based on the route point coordinate information from map information stored in a storage medium and including road information, and for generating limited region map information, said limited region map information generating means including:

route generating means for generating a moving body route based on the route point coordinate information and the road information;

extracting means for setting map information of a strip-shaped region extending along the moving body route as the limited region map information; and     strip-shaped region adjusting means for adjusting a size of the strip-shaped region so as to include the moving body route when it is determined that the information amount of the limited region map information is larger than a specified storage capacity but less than a storage capacity of the storage means;

storage means for storing the limited region map information; and display means for displaying the stored limited region map information;

wherein said extracting means includes shape selection means for selecting a shape of the search region.

2. A map information display system for a moving body, comprising:

coordinate information generating means for generating route point coordinate information representing points on a route being traveled by the moving body and on a scheduled route;

limited region map information generating means for extracting map information for only a limited region based on the route point coordinate information from map information stored in a storage medium and including road information, and for generating limited region map information, said limited region map information generating means including:

route generating means for generating a moving body route based on the route point coordinate information and the road information;

extracting means for setting map information of a strip-shaped region extending along the moving body route as the limited region map information; and     strip-shaped region adjusting means for adjusting a size of the strip-shaped region so as to include the moving body route when it is determined that the information amount of the limited region map information is larger than a specified storage capacity but less than a storage capacity of the storage means;

storage means for storing the limited region map information;

display means for displaying the stored limited region map information; and current position coordinate information detection means for detecting current position coordinate information of the moving body, wherein said extracting means adds the current position coordinate information to the limited region map information.

3. Limited region map information generating means for a map information display system for a moving body, said limited region map information generating means for extracting map information for only a limited region based on route point coordinate information from map information stored in a storage medium and including road information, and for generating limited region map information, said limited region map information generating means comprising:

route generating means for generating a moving body route based on the route point coordinate information and the road information;

extracting means for setting map information of a strip-shaped region extending along the moving body route as the limited region map information; and strip-shaped region adjusting means for adjusting a size of the strip-shaped region so as to include the moving body route when it is determined that the information amount of the limited region map information is larger than a specified storage capacity but less than a storage capacity of the storage means;

wherein said extracting means includes shape selection means for selecting a shape of the search region.

\* \* \* \* \*